(No Model.)
H. CASSARD.
GALVANIC BATTERY.
No. 388,181. Patented Aug. 21, 1888.
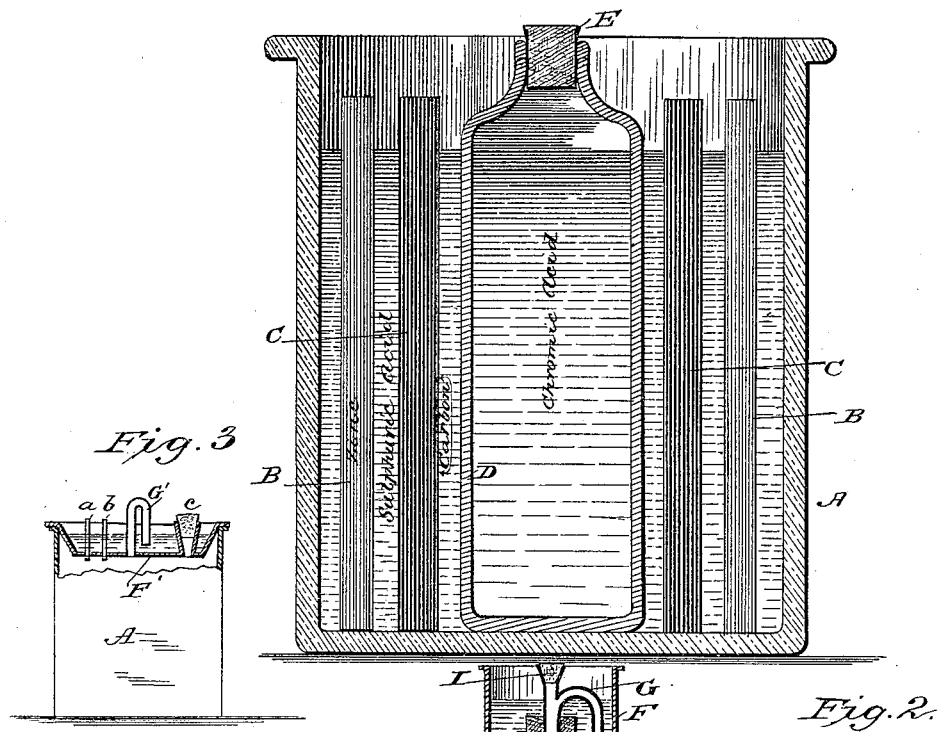
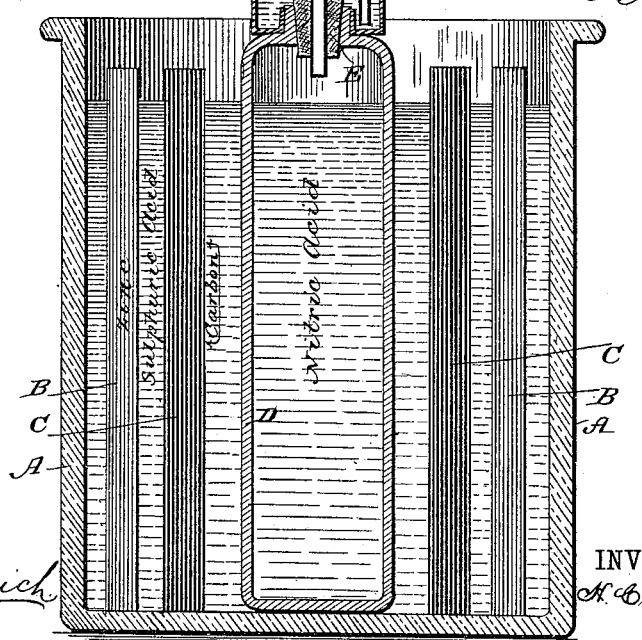
WITNESSES:
Fred G. Dieterich
Edw. U. Byrn
INVENTOR:
H. Cassard
BY Munn & Co.
ATTORNEYS.

UNITED STATES PATENT OFFICE.

HOWARD CASSARD, OF BALTIMORE, MARYLAND.

GALVANIC BATTERY.

SPECIFICATION forming part of Letters Patent No. 388,181, dated August 21, 1888.

Application filed November 28, 1887. Serial No. 256,367. (No model.)

*To all whom it may concern:*

Be it known that I, HOWARD CASSARD, of Baltimore city, in the State of Maryland, have invented a new and useful Improvement in Galvanic Batteries, of which the following is a specification.

My invention is in the nature of a new galvanic battery designed with reference to greater efficiency and to prevent the escape of gases. To these ends it consists in the peculiar construction and arrangement of parts which I will now proceed to describe in connection with the drawings, in which—

Figure 1 is a vertical section of a battery constructed in accordance with my invention. Fig. 2 is a similar view of a modification, and Fig. 3 is a similar view of a still further modification.

A represents the battery-jar; B, the zinc element composed of a series of rods; C, carbon sticks (or platinum electrode;) D, a porous cell whose mouth is contracted like a bottle and hermetically sealed by a stopper, E.

Into the porous bottle D is placed the oxidizing agent—such as a solution of chromic acid—and outside of the bottle and within the jar A is placed the usual solution of sulphuric acid in water. Ordinarily the carbon C (which only serves the purpose of an electrode) is placed within the oxidizing solution within the porous cell. In my invention it is taken out of this cell and placed in the same solution with the zinc element, and I find a much more effective battery by doing this, which may be explained in this way: First, the carbon is placed in a solution which is a good conductor, instead of being retained in the oxidizing solution, which is a bad conductor, and, secondly, all oxidation of the carbon by the oxidizing agent is avoided. By taking the carbon out of the oxidizing agent I am also enabled to conveniently close the top of the cell containing said oxidizing agent and prevent the escape of gases. This is beneficial no matter what these gases are. Thus, if oxygen be liberated, as when chromic acid is used, this oxygen is retained for useful effect in the oxidizing agent, and if the gases are noxious—such, for instance, as when nitric acid is used as the oxidizing agent, as in Fig. 2—these gases may be trapped and combined with other reagents to convert them into non-volatile compounds. Thus, in Fig. 2, a small cup, F, may be mounted upon the top of the porous bottle containing the nitric acid. A glass tube, I, is then fitted through the cork E and allowed to extend to the interior of the bottle D, into the space above the level of the nitric acid, while a branch pipe or leg, G, extends from tube I downwardly into a liquid seal contained in cup F. This seal may be a solution of caustic lime, soda, or other bases that will quickly unite with the acid fumes and form new compounds that do not pass into the air, but settle in the solution. The pipe I has its upper end normally closed by a cork, except when pouring nitric acid into the bottle; but the pipe G always allows the gases from nitric acid to escape into the chemical liquid seal.

The cup F need not be made so small as to simply rest upon and cover the bottle, as in Fig. 2, but it may, as in Fig. 3, be made as a wide dish, F', that rests upon the outer battery-jar. In this modification, $a$ $b$ are the tubes through which the circuit-wires connect with the battery elements. C is the filling-tube, and G' is the trapped tube for the gases.

Having thus described my invention, what I claim as new is—

1. A galvanic battery consisting of a jar having an acidulated exciting-fluid, a porous cell or bottle immersed in the same and containing an oxidizing agent, and an oxidizable metal and an electrode, both immersed in the same exciting-fluid, substantially as and for the purpose described.

2. A galvanic battery consisting of a jar having an acidulated exciting-fluid, a porous cell immersed within the same and having an oxidizing agent and a hermetically-sealed mouth, and an oxidizable metal and an electrode, both immersed in the exciting-fluid outside of the porous cell, substantially as and for the purpose described.

3. The combination, with a galvanic battery, of a cover formed as a cup with a liquid seal, and a bent tube communicating with the fuming-cell of the battery and trapped in the liquid seal, substantially as and for the purpose described.

The above specification of my invention signed by me in the presence of two subscribing witnesses.

HOWARD CASSARD.

Witnesses:
  EDWD. W. BYRN,
  SOLON C. KEMON.